US000001828H

United States Statutory Invention Registration [19]

[11] Reg. Number: H1,828

Wong et al.

[45] Published: Jan. 4, 2000

[54] COLORANT DISPERSIONS

[75] Inventors: Raymond W. Wong; Marcel P. Breton, both of Mississauga, Canada

[73] Assignee: Xerox Corporation, Stamford, Conn.

[21] Appl. No.: 08/902,685

[22] Filed: Jul. 30, 1997

[51] Int. Cl.[7] ..... C09D 5/00

[52] U.S. Cl. ..... 523/161; 523/201; 106/31.33; 106/31.65; 366/69; 430/115

[56] References Cited

U.S. PATENT DOCUMENTS 5,545,504 8/1996 Keoshkerian et al. ..... 430/137

*Primary Examiner*—Harold J. Tudor
*Attorney, Agent, or Firm*—Eugene O. Palazzo

[57] ABSTRACT

A process for the preparation of colored dispersions which comprises adding colorant, a liquid vehicle, a free radical initiator, and a stable free radical agent to a microfluidizer; heating at a temperature of from about 100 to about 160° C.; and thereafter, optionally cooling.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLORANT DISPERSIONS

REFERENCE TO COPENDING APPLICATIONS AND ISSUED PATENTS

In U.S. Pat. No. 5,322,912, there are disclosed free radical polymerization processes for the preparation of resins by heating at a temperature of, for example, from about 100° C. to about 160° C. a mixture comprised of a free radical initiator, a stable free radical agent, and at least one polymerizable monomer compound. U.S. Pat. No. 5,312,704, illustrates a toner composition comprised of pigment particles, and a resin comprised of a monomodal polymer resin or monomodal polymer resin blends and wherein the monomodal resin or resin blends possess a narrow polydispersity; and in U.S. Pat. No. 5,145,518, there is illustrated an ink composition comprised of an aqueous liquid vehicle and particles of an average diameter of about 100 nanometers or less, and which particles comprise micelles of block copolymers of the formula ABA, wherein A represents a hydropholic segment and B represents a hydrophobic segment, and wherein dye molecules are covalently attached to the micelles, the dye molecules being detectable when exposed to radiation outside the visible wavelength range.

Stable free radical polymerization processes are illustrated in the following copending applications and patents: U.S. Pat. No. 5,401,804; U.S. Ser. No. 08/307,192, U.S. Pat. No. 5,322,912; U.S. Ser. Nos. 08/214,518, 08/223,418, U.S. Pat. Nos. 5,412,047, 5,455,315, 5,552,502, 5,549,998, 5,530,079, 5,498,679 and 5,449,724.

Also, in U.S. Pat. No. 5,545,504 there is illustrated pigment dispersions.

The disclosures of each of the above mentioned patents and copending applications are totally incorporated herein by reference in their entirety.

BACKGROUND OF THE INVENTION

The present invention is generally directed to processes for the preparation of ink compositions and ink jet printing methods thereof. More specifically, the present invention relates to processes which provide sterically and/or electrostatically stabilized colorant, especially pigment particles suitable for use in electrophotographic imaging and ink jet printing methods. In embodiments, the present invention relates to processes for the preparation of highly stable colorant dispersions, such as pigment dispersions selected for ink jet inks, and wherein the dispersions can be prepared at high temperatures, for example at about equal to or above 100° C., with microfluidization. The present invention also relates to polymerization processes for preparing stabilized resin particles that possess narrow molecular weight distributions or polydispersity ($M_w/M_n$) properties and narrow particle size distributions, and which polymerization processes can be accomplished with high monomer to polymer conversion. In embodiments, the present invention relates to polymerization processes that directly yield stabilized resin particles with resin number average molecular weights ($M_n$) equal to or above about 2,000 to about 500,000, and with a resin polydispersity ratio of the weight average molecular weight ($M_w$) to the number average molecular weight ($M_n$) of from about 1.0 to about 2.0, and preferably from about 1.1 to about 1.5. Stabilized refers, for example, to electrostatic and/or steric solid-liquid or colloidal dispersion phenomena. The stabilized resin particles and stabilized colorant, such as pigment particles that can be formed by in situ monomer polymerization reactions and colorant, such as pigment coupling reactions, respectively, in embodiments, may be used directly in selected liquid ink imaging processes without the need for further processing steps, such as isolation, purification, classification, and the like. In other embodiments, the present invention provides processes for preparing stabilized colorant, such as pigment particles. The present invention also provides, in embodiments, a pseudo-living polymerization process that enables the direct preparation of narrow polydispersity homopolymeric and copolymeric reactive emulsifiers, or stabilizers which may be selected to prepare stabilized resin particles directly from monomers, and stabilized colorant particles.

In embodiments, first formed intermediate polymers, referred to as stabilizer compounds or reactive emulsifiers, are of the formula (I-A-B)-SFR where I is a free radical initiator molecular segment, or fragment, A is a polymeric segment, and B is a polymeric segment, and which A and B segments can be similar, or dissimilar in composition and physical properties, and SFR represents a covalently bonded and thermally labile latent stable free radical functional group. The intermediate polymers may be optionally isolated and stored indefinitely at ambient temperature, that is about 25° C., or at room temperature, about 25 to about 35° C., or reacted directly, or in situ, with additional monomer or monomers to form stabilized resin or colorant particles. The processes of the present invention can, in embodiments, select known free radical initiators in combination with, for example, an oxygenated stable free radical agent, and a free radical reactive, polymerizable, monomer or monomers to enable stabilized, narrow polydispersity, homo and copolymeric resin particles. The aforementioned resin formation and stabilization processes can optionally incorporate a colorant into the reaction mixture before, during, or after polymerization to primarily provide particle coloration capability. In an alternative embodiment the stabilized colorant, such as pigment particles may be added to the aforementioned stabilized resin particle formation process to provide enhanced pigment dispersion and excellent stability properties to the resulting pigmented resin particles or toner particles. Enhanced colorant, such as pigment dispersion, and excellent resin particle stability imparts desirable image quality characteristics to electrophotographic and liquid ink impressions and transparencies, particularly for color images, for example high fidelity color reproduction and transparency projection efficiencies. Images generated with the ink compositions obtained with the processes of the present invention in embodiments thereof are sharp, waterfast, lightfast, and of high optical density, exhibiting substantially no, or minimal feathering, and moreover, the inks can be electrically conductive.

PRIOR ART

Known microfluidizers will not it is believed effectively enable the preparation of highly stable pigment dispersions at high temperatures of, for example, exceeding about 100° C., and more specifically, from about 120 to about 150° C. Also, these known fluidizers and processes thereof possess narrow operating limits, and in many instances low product yields are obtained. These and other disadvantages are eliminated or minimized with the processes of the present invention.

Additionally, conventional processes for preparing sterically and/or electrostatically stabilized resin, or sterically stabilized pigment particles possess a number of disadvantages including the known complex problems associated with anionic and cationic processes which require scrupulously dry solvents and reactants, and monomer compounds without reactive functionality. Other stabilization processes known in the art select oxygenated polymeric compounds, such as polysaccharides, as macromolecular steric stabilizers. These stabilizer compounds are either physi-sorbed or physically embedded into the surface of the resin or toner particles. Covalent attachment of these and other stabilizer compounds to the particle surface can be difficult and costly. Oxygenated polymeric steric stabilizer compounds typically render the resulting particles humidity sensitive.

The following patents, the disclosures of which are totally incorporated herein by reference in their entirety, are mentioned:

U.S. Pat. No. 5,545,504 which discloses certain ink jettable toner compositions and processes thereof.

U.S. Pat. No. 4,597,794 which discloses an ink jet recording process which comprises forming droplets of an ink and recording on an image receiving material with the droplets, the ink being prepared by dispersing fine particles of pigment in an aqueous dispersion medium containing polymer having both a hydrophilic and a hydrophobic portion.

U.S. Pat. No. 4,846,893 discloses a process for the preparation of a surface treated pigment, and wherein pigment particles are dispersed in a solution of a water soluble high polymer containing radical generation sites to absorb the water soluble high polymer on the surfaces of the pigment particles, adding vinyl monomer to the resulting aqueous liquid dispersion of the pigment particles subjected to the adsorption treatment and polymerizing in the presence of a polymerization initiator to form a polymer layer on the surfaces of the pigment particles.

U.S. Pat. No. 4,476,210 discloses a stable colored liquid developer with an improved optical density resulting from a colored dye being imbibed into a thermoplastic resin core. The liquid developer can comprise a marking particle dispersed in an aliphatic dispersion medium, the marking particle being a thermoplastic resin core having an amphipathic block or graft copolymeric steric stabilizer irreversibly chemically or physically anchored to the thermoplastic resin core, with the dye being imbibed in the resin core and being soluble therein and insoluble in the dispersion medium. The colored liquid developer can be prepared by generating a graft or block copolymer amphipathic steric stabilizer, anchoring the stabilizer to a thermoplastic resin core, and to the aliphatic dispersion of the particle, or particles, and adding a solution of a dye dissolved in a polar solvent, preferably methanol, the dye being soluble in the thermoplastic resin core to enable it to be imbibed therein and substantially insoluble in the dispersion medium.

U.S. Pat. No. 5,281,261 discloses an ink composition comprising an aqueous liquid vehicle and pigment particles having attached to the surfaces thereof a polymerized vinyl aromatic salt. The ink composition is suitable for ink jet printing processes, particularly thermal ink jet printing processes.

U.S. Pat. No. 4,530,961 discloses an aqueous dispersion of carbon black grafted with hydrophilic monomers, such as alkali or ammonium carboxylate bearing polymers. The dispersion has a viscosity of about 2 to about 30 cP (centipoise) for a carbon black content of from about 1 to 15 percent by weight.

U.S. Pat. No. 4,314,931 discloses a process for substantially eliminating polymerization inhibition in a pigment containing dispersion polymerization reaction, which process involves grafting polymer molecules onto the pigment used in the polymerization reaction, and whereby there results a polymerized product which contains essentially no monomer.

U.S. Pat. No. 4,581,429 discloses process for the preparation of short chain or oligomeric homopolymers and copolymers. This process employs an initiator having the formula (in part)=N-O-X, where X is a free radical species capable of polymerizing unsaturated monomers.

SUMMARY OF THE INVENTION

Examples of objects of the present invention include:

An object of the present invention is to provide polymerization processes and polymers and stabilized particles therefrom that overcome, or minimize many of the problems and disadvantages of the prior art.

In another object of the present invention there is provided processes for the preparation of colored, especially pigmented, dispersions with a modified microfluidizer, the basic unmodified microfluidizer being available from Microfluidics Corporation.

It is a further object of the present invention to provide colored, such as pigment, stabilization processes wherein there is accomplished the direct reaction of thermally labile reactive emulsifier or stabilizer compounds with colorant, especially pigment particles, such as carbon black, to provide surface modified and dispersion stabilized colorant particles.

Another object of the present invention is to provide a polymerization reaction system which affords jettable colored or colorless polymeric particles (latex), that is a thermal ink jet ink composition which is thermally stable prior to jetting and may be subsequently readily jetted by known means and then fixed to a receiver member by thermal, irradiation, or pressure at from about 25° C. to about 150° C.

Another object of the present invention is to provide a polymerization reaction system which may be conducted in the presence of conventional free radical polymerization inhibiting pigments such as carbon black.

In yet another object of the present invention there are provided imaging methods and ink jet compositions, and wherein there are enabled fused images which possess desirable mid frequency line edge noise (MFLEN) or edge raggedness, high resolution of from about 300 to about 600 spots per inch, colorfastness, waterfastness, reduced spattering, and dispersion stability. Also, the ink jet compositions of the present invention possess in embodiments excellent latency, recoverability, and do not form unwanted deposits on the surface of the heater elements of the printhead, that is they do not produce any kogation.

The processes of the present invention in embodiments relate to the direct preparation of stabilized latex particle compositions and stabilized colorant, such as pigment particles, which are suitable for use in electrophotographic imaging, and ink jet imaging and printing, including color processes. The stabilizer molecules or reactive emulsifiers generated by the processes of the present invention, in embodiments, are essentially monomodal, that is the molecular weight distribution is narrow and indicative of a Poisson character and without substantial shoulders or side bands.

Further, in embodiments the processes of the present invention provide efficient methods for the generation of high molecular weight, for example, in excess of about 250,000 to about 500,000 weight average molecular weight polymeric resins, comprising preparing and isolating a stable free radical terminated reactive emulsifier compound with a weight average molecular weight of from about 10,000 to about 50,000 and preferably about 30,000 in accordance with stable free radical polymerization processes, and thereafter, reacting the isolated reactive emulsifier compound with appropriate amounts of additional monomer. An advantage of the aforementioned two stage reaction process is the ability to conduct particle formation and stabilization processes of the present invention at higher solids levels or concentrations, for example, at about 10 to about 50 weight percent solids and above.

The present invention in embodiments relates to the reaction of a reactive stabilizer, such as stable free radical/polystyrene sulfonate with a colorant, especially pigment in a microfluidizer and heating the fluidizer at a temperature of from about 100 to about 150° C., cooling, and wherein the stabilizer is chemically attached to the colorant surface.

Embodiments of the present invention include a process for the preparation of colored dispersions which comprises adding colorant, a liquid vehicle, a free radical initiator, and a stable free radical agent to a microfluidizer; heating at a temperature of from about 100 to about 160° C.; and thereafter, optionally cooling; a process for the preparation of colored liquid developer compositions comprising heating in a microfluidizer a mixture of colorant, at least one stabilizer compound containing a covalently bonded and thermally labile stable free radical reactive group, and a liquid vehicle to generate stabilized pigment particles; a process wherein the colorant is a pigment, the microfluidizer is closed, at least one is from one to about 5, heating is from about 100 to about 150° C., and wherein there are generated stabilized pigment particles; a process wherein the heating is from about 120 to about 140° C.; a process wherein the microfluidizer contains an about six foot heating tape wrapped around the lower half of the feeding tank thereof, an air or water inlet and air or water outlet tube connectors attached to two holes on opposite sides of the isolator of said microfluidizer to cool the microfluidizer plunger seal area below about 60° C.; a cooling jacket contained around the pump body of the fluidizer to cool the microfluidizer pump body and the seal retainer to between a minus about 55 and zero °C.; and a cooling coil positioned at the top of the microfluidizer feeding tank; a process wherein the pigment is carbon black, the liquid is water, and there are generated ink compositions; a process wherein the pigment dispersion is comprised of from about 1 to about 30 weight percent of pigment, and from about 1 to about 20 weight percent of stabilizer compound, with the sum of the pigment and stabilizer compound being from about 2 to about 45 weight percent; a process wherein the stabilizer is of the formula (I-A-B) wherein I is a free radical initiator, A and B represent polymer segments, and the stable free radical reactive group is covalently bonded to said stabilizer; a process wherein the stable free radical is derived from a nitroxide and the free radical initiator possesses a half life of at least about one second; a process wherein the nitroxide is 4-hydroxy-2,2,6,6-tetramethyl-1-piperidinyloxy, and the free radical initiator is a peroxide; a process comprising mixing in a container stabilized colored particles with a liquid ink vehicle and filtering the resulting ink to generate thermal ink jet inks; a process wherein the vehicle is water, and there is added to the ink a cosolvent additive, and a biocide; a process wherein the liquid vehicle is selected from the group consisting of water, hydrophilic solvents, and mixtures thereof; a method of imaging comprising jetting with a liquid jetting means an ink jettable ink composition comprised of a liquid carrier vehicle and stabilized core particles comprised of resin, colorant, and a stabilizer component, which is covalently bonded to the core particles, in a predetermined pattern onto a receiving member to form an image; and fixing the image to a receiver by heating or irradiating the image and/or the receiver at from about 40 to about 150° C., and wherein the colorant dispersion selected for the ink is prepared by the processes illustrated herein; a method wherein the colorant is a pigment, and wherein there results high quality images with an optical density of from about 1.0 to about 1.5 for black images; a method wherein the ink composition has a latency of about 5 seconds to about 2,000 seconds, wherein the heating or fixing of the image is accomplished at a temperature of about 25° C. to about 90° C., and wherein the resulting high quality images have edge raggedness or an MFLEN value of from about 1 to about 10; a method wherein the resulting high quality images have a resolution of at least about 600 spi when jetted from an ink jet printhead, and wherein there results essentially no kogation on heating elements of the jetting means after continuous jetting of the ink at a rate of from about $10^6$ to about $10^9$ drops; a process wherein the liquid vehicle is selected from the group consisting of water, ethylene glycol, propylene glycol, diethylene glycol, glycerine, dipropylene glycol, polyethylene glycol, polypropylene glycol, amides, ethers, carboxylic acids, esters, alcohols, organosulfides, organosulfoxides, sulfones, dimethylsulfoxide, sulfolane, hydroxy ether compounds, amino alcohols, ketones, and mixtures thereof; a process wherein the colorant is a pigment, and wherein the pigment is sterically and electrostatically stabilized by the stable free radical reactive stabilizer compound covalently bonded thereto; a process wherein the pigment is thermally stable in a dispersion and in a jetting device over a temperature range of from about 5° C. to about 200° C.; and a process wherein the colorant is a pigment selected from the group consisting of magenta, cyan, yellow, red, blue, green, carbon black, magnetites, and mixtures thereof.

Also, in embodiments of the present invention there are provided processes wherein there is enabled the chemical reaction of a reactive stabilizer component, such as SFR-polystyrene sulphonate with a suitable colorant surface, or surfaces, especially pigment surface, such as carbon black, and wherein there results stabilized colorant dispersions where the stabilizing polymer is chemically attached to the colorant surface.

DETAILED DESCRIPTION OF THE INVENTION

The microfluidizer preferably selected for the processes of the present invention is considered a closed system and contains heating tape, cooling jacket, and cold air or cold water to cool and maintain the temperature of the seal retainer area to below about 60° C. (Centigrade). More specifically, the modified microfluidizer is comprised of a model M100F microfluidizer available from Microfluidics Corporation with the following modifications. A six feet heating tape, available from Electrothermal (cat. #HT642 S962), is wrapped around the lower half of the feeding tank. Air inlet and outlet tube connectors are installed on two holes generated on opposite sides of the isolator for the primary purpose of cooling down the plunger seal and cooling the face seal retainer area with air or water to between about 5 and about 60° C. A cooling jacket is installed around the pump body to cool down the temperature of the pump body and the seal retainer to between about 5 and about 80° C. The cooling temperature in the jacket is usually maintained between about a minus 55 and about zero °C. The microfluidizer is also modified with the addition of a cooling coil at the top of the feeding tank. This controls the steam pressure built up within the feeding tank to between about 0 and about 40 psi and preferably between about 25 and about 35 psi. Adding dry ice to the top of the feeding tank can be selected for cooling purposes. Also, there can be accomplished the heating of the contents of the microfluidizer in a separate heated reactor instead of or in addition to the feeding tank supplied with the microfluidizer. The separate heated reactor reduces the time needed to reach the set operating temperature. An intermediate cooler, between the feeding tank or the reactor and the pump, may also be used to improve the overall cooling efficiency.

In embodiments of the present invention, there are provided processes utilizing a microfluidizer for generating an imaging composition comprising a liquid carrier vehicle, and marking particles comprised of a core resin or resins, a colorant, optional additives, and at least one stable free radical reactive polymeric stabilizer compound, which is substantially covalently attached to the resin particle surface or embedded in the resin particle core, that is a composition wherein the stable free radical reactive stabilizer compound is substantially chemically bound or covalently attached to the core resin wherein, for example, a hydrophobic end of the stabilizer compound is substantially embedded in the hydrophobic core resin particles. Also disclosed are compositions wherein the stable free radical reactive stabilizer compound is a block copolymer of the formula (A-B-)-SFR or (I-A-B)-SFR wherein A is a hydrophilic polymer or copolymer segment, such as polystyrene sulfonate sodium salt, B is a hydrophobic polymer or copolymer segment, such as polystyrene, I represents a free radical initiator reactant residue, such as a benzoyl group, and wherein -SFR is a terminal and thermally labile latent stable free radical functional group covalently bonded to the B segment. Further disclosed are compositions and processes wherein the stable free radical block copolymer compound is of the formula (A-B)-SFR or (I-A-B)-SFR, which when heated in the presence of core resin monomer affords a stabilized marking particle of the formula (A-B)n-C where C represents the core polymer resin, (A-B) represents the stabilizer adduct bound directly to the core polymer resin via the hydrophobic block segment B, and wherein and n represents the number of polymeric stabilizer groups derived from the SFR reactive stabilizer compound which are bonded to the core polymer resin; wherein n is an integer of from 1 to about 107, from about 5 to about 75, or alternatively up to about 15 percent by weight of stabilizer compound to the total weight of the core resin. The free radical initiator reactant, fragment, or residue designated as I in the formula (I-A-B)-SFR is embodied in the alternative formula representation (A-B)-SFR.

In embodiments, there are provided processes for preparing stabilized colorant, especially pigment particles, by heating suitably reactive pigment particles with a stabilizing quantity of the reactive emulsifier. The resulting stabilized pigment particles may be further admixed and heated with free radical reactive monomer and optional resin to polymerize the monomer onto the pigment particle, which further compatibilizes resulting in pigment particles with incipient resin and resin particles, and thereby provides colorized resin particles with highly uniform colorant, especially pigment particle dispersions.

Embodiments of the present invention are directed to processes for the preparation of liquid ink compositions comprising: heating a mixture of at least one free radical reactive pigment, or colorant, particle and a stabilizer compound of the formula (I-A-B)-SFR illustrated herein and containing a covalently bonded and thermally labile latent stable free radical reactive group to primarily permit stabilized pigment particles, wherein the stabilized pigment particles contain at least one stabilizer compound bonded directly thereto; dispersing and then heating the stabilized pigment particles and at least one free radical reactive monomer in a suspending liquid vehicle to form stabilized and pigmented resin particles wherein the stabilized pigment particles provide a loci and a source of pseudoliving free radical species which polymerize the free radical reactive monomers thereon, and stabilize the product against agglomeration or precipitation while in the suspending liquid vehicle.

The amount of stabilizer compound relative to the colorant, such as pigment, is selected to provide the desired level of stability to the resultant stabilizer-pigment adduct, for example, preferably up to about 10 to 100 weight percent of the stabilizer compound based on the weight of the colorant, such as pigment particles, and preferably from about 10 to about 70 weight percent.

One class of monomers that may be selected are $C_3$–$C_6$ (with from about 3 to about 6 carbon atoms) monoethylenically unsaturated monocarboxylic acids, and known alkali metal, such as the lithium, potassium and sodium salts, and ammonium salts thereof. The $C_3$–$C_6$ monoethylenically unsaturated monocarboxylic acids include acrylic acid, methacrylic acid, crotonic acid, vinylacetic acid, and acryloxypropionic acid. Acrylic acid and methacrylic acid are in embodiments the preferred monoethylenically unsaturated monocarboxylic acid monomers. These monomers and comonomers can be selected in various suitable amounts, such as in amounts of from about 5 to about 95, or from about 15 to about 50 weight percent of the total weight of the reactants.

Another class of monomers that may be selected are the $C_4$–$C_6$ monoethylenically unsaturated dicarboxylic acids and the known alkali metal and ammonium salts thereof, and the anhydrides of the cis dicarboxylic acids. Suitable examples thereof include maleic acid, maleic anhydride, itaconic acid, mesaconic acid, fumaric acid, and citraconic acid. Maleic anhydride and itaconic acid are two of the preferred monoethylenically unsaturated dicarboxylic acid monomers.

The acid monomers selected may be in their acid forms or in the form of the alkali metal or ammonium salts of the acid. Suitable bases selected for neutralizing the monomer acids include alkali metal bases, such as sodium hydroxide, ammonium hydroxide, potassium hydroxide, and the like. The acid monomers may be neutralized to a level of from about 0 to about 50 percent and preferably from about 0 to about 20 percent. More preferably, the carboxylic acid monomers are preferably selected in the completely neutralized form, that is, for example, wherein the carboxylic acid functional groups (—$CO_2H$) are completely converted using stoichiometric or excess molar amounts of the appropriate base to corresponding carboxylate salts (—$CO_2M$) wherein M is an alkali metal or ammonium salt selected from the group of Li, Na, K, Rb, $NR_4$, wherein R is selected from the group of hydrogen, alkyl, alkenyl, alkylaryl, and aryl, and the like counterions. R can contain from about 1 to about 25 carbon atoms for the aliphatic segments, and from about 6 to about 30 for the aryl segments.

Polymerizable monomers include monoethylenically unsaturated carboxylic acid-free monomers. Suitable monoethylenically unsaturated carboxylic acid-free monomers are copolymerizable with the carboxylic monomers. Typical monoethylenically unsaturated carboxylic acid-free monomers which may be selected include alkyl esters of acrylic or methacrylic acids, such as methyl acrylate, ethyl acrylate, butyl acrylate; hydroxyalkyl esters of acrylic or methacrylic acids, such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, 2-acrylamido-2-methylpropane-sulfonic acid and salts thereof, and dially dialkyl quaternary ammonium salts.

Other suitable comonomers include acrylamides, alkyl and aryl amide derivatives thereof, and quaternized alkyl and aryl acrylamide derivatives.

Monomers, polymers and copolymers of the present invention can, in embodiments, be separated from one another or from the polymerization reaction mixture by, for example, solvent precipitation cooling, changing the pH of the reaction media, for example, from about 7 to about 4, and other known conventional separation techniques.

The aforementioned monomers and comonomers can be selected for the polymerization reactions in amounts of from about 1 to about 95 weight percent of the total weight of reactants.

Examples of suitable initiators selected for the processes of the present invention include any conventional free radical initiators which have a half life of, for example, at least 1 second at the polymerization temperature. Preferably, the initiator should possess a half life of from about 10 second to about 2 hours and preferably from about 10 seconds to about 10 minutes at the reaction temperature. In embodiments, a preferred heating profile is as follows: the initiator is added to the reaction mixture and then heated to about 80 to about 90° C. for from about 5 minutes to about 5 hours, and preferably from about 30 minutes to about 2 hours, to effect complete reaction of the initiator with the monomer(s), and then heating at about 120 to about 140° C. for about 1 to about 20 hours to complete the polymerization of the monomer(s). Specific examples of initiators include oxygen, organic peroxides, hydrogen peroxide, certain alkyl hydroperoxides, dialkyl peroxides, peresters, percarbonates, peroxides, persulfates and azo initiators. Suitable initiators include hydrogen peroxide, t-butyl hydroperoxide, di-tertiary butyl peroxide, tertiary-amyl hydroperoxide, potassium persulfate, and methylethyl ketone peroxide. The initiators are selected in suitable amounts, for example from about 0.05 percent to about 35 percent, or from about 1 to about 33, based for example, on the weight of total polymerizable monomer. A preferred range of initiator for preparing low glass transition temperature resin particles is from about 0.5 to about 20 percent by weight of the total polymerizable monomer. When the initiators are selected in amounts of about 0.001 to about 0.005 weight percent, weight average molecular weights in excess of about 500,000 to about 700,000 of the resulting polymeric particles can be obtained. In a preferred embodiment, an intermediate molecular weight stable free radical terminated stabilizer compound is first formed and then added to a second mixture containing additional monomer with the result that higher molecular weight polymers with narrow polydispersity may be achieved.

Redox initiators may also be selected for the processes of the present invention. These initiators include, but are not limited to, sodium bisulfite, sodium sulfite, isoascorbic acid, sodium formaldehyde-sulfoxylate, and the like indicated herein. When selected, the redox initiators may be added in amounts of from about 0.05 percent to about 16 percent, based on the weight of total monomer. A preferred range is from about 0.5 to about 5 percent by weight of total monomer. Some of these initiators may introduce salt byproducts into the aqueous polymer product, thus in embodiments of the present invention they are avoided. A preferred initiator system is one which decomposes at about ten times faster than the decomposition rate of, for example, potassium persulfate alone. This is achieved by the use of a redox system such as the combination of potassium persulfate and sodium bisulfite. A redox reaction is a reaction in which one (or more) electron(s) is transferred between the reactant species. Other redox systems are known and can be used to polymerize the dispersants used in the processes described therein, such as, for example, the combination of persulfate and thiosulfate ions, the combination of ceric ammonium nitrate with isopropanol. Applications of these initiator systems are described by Ian M. Campbell in *Introduction to Synthetic Polymers,* Oxford University Press, 1994, p. 113, the disclosure of which is totally incorporated herein by reference. The stable free radical selected may be any known suitable stable free radical agent, such as those illustrated in the copending applications and patents mentioned herein. Examples of stable free radical compounds include 2,2,6,6-tetramethyl-1-piperidinyloxy free radical (TEMPO); 4-hydroxy-2,2,6,6-tetramethyl-1-piperidinyloxy free radical; 2,2,5,5-tetramethyl-1-pyrrolidinyloxy; 3-carboxy-2,2,5,5-tetramethyl-1-pyrrolidinyloxy; and ditertbutyl nitroxide. The aforementioned stable free radicals and related derivatives are satisfactory for the purpose of moderating the polymerization of a wide variety of different monomer types and comonomers, and are not as effective when used in the homopolymerizations of acrylate monomers. The carbonyl containing stable free radical 4-oxo-2,2,6,6-tetramethyl-1-piperidinyloxy, (4-oxo-TEMPO) is effective for forming acrylate homopolymers and homopolymeric acrylate containing thermoplastic is polymers. The stable free radical agents are selected in amounts of from 0.05 to about 35 percent based on the weight of the total polymerizable monomer. A preferred range of these agents is from about 0.5 to about 25 percent by weight of the total polymerizable monomer, and which monomer may be selected in approximately equivalent molar amounts, or preferably, in slight molar excess amounts of the free radical initiator selected.

Stable free radical compounds are known, reference for example U.S. Pat. Nos. 5,264,204 and 5,179,218, and a number of other suitable stable free radical compounds are available commercially and are readily accessible synthetically, for example, as disclosed in "*Synthetic Chemistry of Stable Nitroxides*", by L. B. Volodarsky et al., CRC Press, 1993, ISBN:0-8493-4590-1, the disclosure of which is totally incorporated herein by reference.

The monomers of the present invention can be polymerized in a variety of polymerization reaction media. The reaction mixture may contain from about 95 to about 98 percent by weight, preferably from about 20 to about 90 percent by weight, and most preferably from 25 to about 85 percent by weight of free radical reactive monomer with the balance comprised of other reactants, reagents, comonomers, colorants, and optional solvents or diluents.

The polymerization reactions of the present invention can be supplemented with a solvent or cosolvent to assist in ensuring that the reaction mixture remains a homogeneous single phase throughout the monomer conversion if desired. Any solvent or cosolvent may be selected providing that the solvent media is effective in permitting a solvent system which avoids precipitation or phase separation of the reactants or polymer products until after all polymerization reactions have been completed. The reaction solvent may be the same or different from the solvent selected as the liquid vehicle depending on the properties desired in the resulting formulation, for example, evaporation rates or volatility, monomer solubility, and the like. Exemplary solvent or cosolvents may be selected from the group consisting of water, polymer product compatible solvents or nonsolvents, that is solvents which dissolve or readily disperse the polymer product, aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives, such as butyl CARBITOL® or CELLOSOLVE®, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

The temperature of the polymerization may range from about 75° C. to about 180° C., preferably from about 110° C. to about 175° C. and more preferably from about 120° C. to about 140° C. At temperatures below about 100° C., the reaction rate is slow and not as attractive industrially without the aid of an acid or base accelerating additive compound.

Since solvent and cosolvent admixtures can be used as the reaction media, the elevated temperatures of the polymerization preferably select a polymerization reactor that is equipped to operate at elevated pressure. In general, it is preferred to conduct the polymerization at from about 10 to about 2,000 pounds per square inch (psi), and more preferably at from about 20 to about 1,000 psi.

The weight average molecular weights referred to herein are measured by gel permeation chromatography using, for example, polyethylene oxide standards for water soluble polymers and polystyrene standards for organic soluble polymers unless specifically stated otherwise.

Although not being desired to be limited by theory, it is believed that when the polymerization reaction processes of the present invention are performed at a temperature at about or above 100° C., the exact temperature depending on the initiator used, all the polymer chains are expected to be initiated at about the same time. This is believed to be an important feature in forming polymer chain products and resin particles having high molecular weights and narrow polydispersities.

The aforementioned undesirable chain coupling or disproportionation termination reactions, so prevalent under the conditions of conventional free radical polymerization systems, are believed to be suppressed under the conditions of the present invention because the effective instantaneous concentration and availability of living free chains is extremely small. In addition, stable free radical agents selected for the present invention do not initiate monomer polymerization, thus new chains are not initiated after an initial incubation period during which it is believed that all polymer chains are initiated at about the same time.

Propagating chains of the present invention are referred to as pseudoliving because the stable free radical agent adds to a propagating chain and the chain is temporarily, but reversibly, terminated, reference U.S. Pat. No. 5,322,912, the disclosure of which is incorporated herein by reference in its entirety. The term "protected" refers, for example, to the availability of chain radical species for selective rather than indiscriminate further reaction with monomer. An unmoderated free radical polymerization chain, that is, a free radical polymerization process without a stable free radical agent present, in contrast, has a reactive or "open" chain end throughout its lifetime, which is inevitably typically irreversibly terminated on the order of seconds.

The present invention provides several specific advantages in embodiments as follows.

With the process of the present invention, stable highly colored, especially pigmented, dispersions can be generated at high temperatures of about 100° C., or in excess of 100° C., polymer product polydispersities can be varied from between approximately 1.0 to approximately 2.0, or higher if desired, and preferably from about 1.0 to less than about 1.5 depending on the monomer/comonomer system selected, and by varying the ratio of stable free radical agent to free radical initiator molar concentration. When the polymerization process conditions of the present invention are attempted with monomers without using the stable free radical (SFR) additive, considerably broader molecular weight resins may be obtained, for example, in excess of about 2.5 to about 3, and conversion rates and extent are lower than those of the present invention in embodiments.

An oxo substituted nitroxide stable free radical agent may be used in the situation where acrylate or acrylate ester homopolymerization products are desired as disclosed in the aforementioned U.S. Pat. No. 5,412,047, and which reactions can be performed in a variety of reaction media including bulk, solution, aqueous or organic emulsion, suspension, phase transfer, or reactive extrusion.

During the reaction of monomer or mixtures of monomers to form polymers, the reaction time may be varied over for example, from about 1 to about 60 hours, preferably between about 2 to 10 hours, and optimally from about 3 to about 7 hours. The optimal reaction time may vary depending upon the temperature, the volume and scale of the reaction, the quantity and type of polymerization initiator and stable free radical agent selected, and relative monomer reactivity.

The polymerization reaction temperature is retained relatively constant throughout the heating step by providing an adjustable external heat source. This temperature is preferably between 100° C. and 160° C. and optimally in embodiments 130° C. to 160° C. Reactions performed above 200° C. tend to result in a broadening of the polydispersity. A reaction volume may be selected for any size that enables simple adding, mixing, reacting, isolating, and formulating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is about 0.001 to about 20, or from about 1 to about 5 weight percent of the total weight of monomer to be polymerized, and is determined by the desired molecular weight of the resin. As the initiator concentration is decreased relative to the weight or molar equivalents of monomer used, the molecular weight or the thermoplastic resin product usually increases.

Water soluble free radical initiators can be optionally employed, examples of which include persulfates; water soluble peroxides and hydroperoxides; more specifically, sodium, potassium and ammonium persulfate; peroxides such as hydrogen peroxide, t-butyl hydroperoxide, cumene hydroperoxide, para-menthane hydroperoxide; and peroxy carbonates. Other water soluble initiators of similar decomposition mechanism may be used if desired.

Preferred initiators are those with a one-hour half life at about 60 to about 95° C. and a ten-hour half life at about 50 to about 80° C. Peroxides, such as peresters and peracids having somewhat higher one-hour half life/temperature relationships, may also be used, preferably if they are accompanied by a promoter compound such as tertiary amine. These initiators are, for example, 2,4-dimethyl-2,5-dibenzyl peroxyhexane (138° C.), tert-butyl peroxybenzoate (125° C.), di-tert-butyl diperoxyphthalate (123° C.), methyl ethyl ketone peroxide (133° C.), dicumyl peroxide (135° C.), tert-butyl peroxycrotonate (118° C.), 2,2-bis-t-butyl (peroxybutane) (119° C.), tert-butyl peroxyisopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. The numbers in parentheses are the 1 hour half life temperatures.

Still other initiators may also be employed if accompanied by a promoter compound, for example 2,4-pentanedione peroxide (167° C.), di-t-butyl peroxide (149° C.), 2,5-dimethyl-2,5-di(t-butylperoxy)-hexyne (149° C.), 2,5-dimethyl-2,5-di(t-butylperoxy)-hexyne (149° C.), 2,5-dimethyl-2,5-di(tbutylperoxy) hexane (138° C.), and the like.

Preferred initiator compounds are t-butyl peroxy isobutyrate (120° C.), t-butyl peroxy 2-ethylhexanoate (95° C.), t-butyl pivalate (76° C.), and t-amyl peroxy 2-ethyl hexanoate (92° C.). Particularly preferred free radical initiators are generally azobisalkylnitrile and diaroyl peroxide compounds.

Water soluble monomer or monomers to be polymerized can be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers is used in effective amounts relative to the free radical initiator, and stable free radical agent, as defined hereinafter.

The stable free radical selected for polymerizing nonacrylate monomers or comonomers can be any stable free radical and as indicated herein including nitroxide free radicals, for example PROXYL (2,2,5,5-tetramethyl-1-pyrrolidinyloxy) and derivatives thereof, DOXYL (4,4-dimethyl-3-oxazolinyloxy) and derivatives thereof, and TEMPO (2,2,6,6-tetramethyl-1-piperidinyloxy) and derivatives thereof, and the like. These stable free radical agent materials are well known in the literature, for example G. Moad et al., *Tetrahedron Letters,* 22, 1165 (1981) as free radical polymerization inhibitors. Other suitable nitroxides used for polymerizing nonacrylate monomers or comonomers are di-tert-butyl nitroxide and related di-tertiary alkyl substituted nitroxides. However, under the polymerization conditions of the present invention, the stable free radical agents function not as inhibitors but as moderators to harness the normally highly reactive and indiscriminate propagating intermediate free radical polymer chain species. The stable free radical agents are preferably soluble in the monomer phase, if more than a single phase is present initially, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance lo desired between the mole ratio of the stable free radical agent, free radical initiator, and propagating free radical polymer chain species may be upset.

The molar ratio of the stable free radical (SFR) agent to free radical initiator (INIT) residing in the monomer phase is for example, from about 0.5 to 5.0, and preferably in the range from about 0.4 to 4.0. Although not desired to be limited by theory, in an embodiment, the molar ratio [SFR:INIT.] of stable free radical agent, for example, 4-oxo TEMPO, to free radical initiator, for example AIBN, is about 2.0 and is believed to be important for success of the process. If the [SFR:INIT.] is too high, then the reaction rate is noticeably inhibited. If the [SFR:INIT.] is too low, then the reaction product has undesired increased polydispersity. It should be noted that when acrylic acid or acrylate ester compounds are polymerized to polyacrylate derivatives without the stable free radical agent of the present process, the product polymers isolated have polydispersities of about 2.0 and above. A preferred stable free radical is the aforementioned TEMPO, and oxo-TEMPO when acrylate homopolymers are desired, and with benzoyl peroxide as a preferred initiator.

In embodiments, the molar ratio of monomer content to stable free radical agent to free radical initiator is from about 6.0:0.2:1.0 to about 10,000:2.5:1.0 and preferably in the range of about 125:2.0:1.0 to about 7,000:1.3:1.0.

Processes of the present invention in embodiments provide for relatively high weight average molecular weights, from weight average molecular weights ranging in size of from about 2,000 to about 500,000 while delivering narrow polydispersity products with high conversion as defined and illustrated herein.

Examples of monomers and comonomers include those that are for example, capable of undergoing a free radical polymerization and include, but are not limited to styrene, substituted styrenes and derivatives thereof, for example halogenated, hydroxylated, and methylated styrenes, acrylates, butadiene and any conjugated diene monomer sufficiently reactive under the specified stable free radical moderated polymerization reaction conditions to afford a stable free radical reaction adduct and subsequently high molecular weight polymer products, for example polymers of n-butyl acrylate, acrylic acid, and the like.

The polymerization reaction rate of the monomers may, in embodiments, be inhibited or accelerated, and the reaction time influenced by the addition of a minor amount of a protic acid selected for example, from the group consisting of inorganic acids, such as phosphoric, sulfuric, hydrochloric, and the like, and organic sulfonic and carboxylic acids such as, camphor sulfonic acid and benzoic acid. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group contained in either the stable free radical agent or in the free radical initiator compound.

By cooling the polymerization reaction to below 60 to 80° C., the stable free radical moderated polymerization process is effectively quenched or terminated. Each new or subsequent addition of mixtures containing monomer, stable free radical, and initiator, accompanied by heating above about 100° C. to about 120° C. provides a new pseudoliving polymeric species having a narrow molecular weight distribution, and each new polymer species continues to grow independently of the other polymer species already established thereby providing the capability of forming well defined, narrow polydispersity, bimodal and multimodal polymer mixtures which may or may not be water soluble.

Additional optional known additives may be selected for the polymerization reactions and which may provide additional performance enhancements to the polymerization and particle forming reactions, for example minor amounts of acidic polymerization promoter compounds such as, camphor sulfonic, benzoic, phosphoric, phosphoric acid esters, phosphonic acids and acid esters, and the like; and additivescan be incorporated into the resulting product, for example colorants, lubricants, release or transfer agents, surfactants, stabilizers, antifoams, antioxidants, and the like.

The ink compositions can be prepared by a number of methods, such as admixing and optionally heating the stable colored, such as pigmented, polymer suspensions obtained with from the modified microfluidizer, such as water soluble styrene sulfonates with pigment particles, such as magnetite, carbon black, surface treated carbon blacks such as ACETYLENE BLACK® from Chevron Oil and CONDUCTEX SC, and mixtures thereof, and cyan, yellow, magenta, green, brown, red, or mixtures thereof in an attritor device, such as the 01 Attritor available from Union Process, or a high shear mixing device, such as polytron homogenizer available from Brinkmann Instrument, or by simply mixing with an overhead stirrer or a shaker apparatus and removing the formed ink composition from the device. After cooling, the ink composition is optionally subjected to filtration, for example, through a 0.8 micron filter for the purpose of achieving pigment dispersions with a volume median diameter of less than about 0.10 microns, and preferably of from about 0.03 to about 0.08 micron, which diameters are determined by a HORIBA particle sizer.

The colorant includes pigment, dye, mixtures thereof, mixtures of pigments, mixtures of dyes, and the like, and especially pigment particles, such as magnetite, especially MAPICO BLACK®, carbon black, especially REGAL 330®, and Raven 5750 and 5250, available from Columbia Chemicals, or mixtures thereof, and cyan, yellow, magenta, green, brown, red, or mixtures thereof in amounts of from about 0.5 to about 15 weight percent of the total monomer and resin used.

In embodiments of the present invention there are provided ink compositions and imaging processes thereof wherein the ink and resulting developed images have a latency of about 5 seconds to about 2,000 seconds, and a recoverability of about 50 seconds to about 2,000 seconds, where latency is defined as the time that a printhead can maintain transit times (between the printhead and the paper) of below about 100 microseconds and where recoverability is defined as the time that a printhead can regain transit times below about 100 microseconds. The resulting developed and fused images, in embodiments, possess excellent mid frequency line edge noise known as MFLEN, also referred to as line raggedness, of about 1 to about 10, and preferably from about 1 to about 3.

Encompassed within the scope of the present invention are colored toner particles and ink particle compositions comprising water soluble dispersants, colored particles, latency enhancing solvents, and the like additives, which are useful as liquid ink developers, and particularly ink jet inks, comprised of stabilized pigments or colorants red, blue, green, brown, magenta, cyan and/or yellow particles, as well as mixtures thereof, which may, in embodiments, be sterically stabilized or resin compatibilized pigment particles as illustrated herein. Specific illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL, Permanent Yellow GR, as well as Sunbrite Yellow 14 and 17. The aforementioned pigments are incorporated into the ink composition in various suitable effective amounts providing the objectives of the present invention are achieved. In one embodiment, these colored pigment particles are present in the ink composition in an amount of from about 2 percent by weight to about 15 percent by weight.

Known ink additives, such as biocides, humectants, and the like, may be added to the ink in various effective amounts, such as for example from about 1 to about 10 weight percent.

Weight percent refers for example, to the amount of the component divided by the total weight of all components unless otherwise indicated, and wherein the total of all components is about 100 percent, or parts.

The following Examples are being provided to further illustrate various species of the present invention, it being noted that these Examples are intended to illustrate and not limit the scope of the present invention. Parts and percentages are by weight unless otherwise indicated.

EXAMPLE I

Synthesis of Poly(Styrene Sulfonate)-TEMPO Terminated Sodium Salt (PSST):

720.3 Grams of ethylene glycol (Stanchem), 240.0 grams of deionized water, 240.0 grams of styrene sulfonate sodium salt monomer (Aldrich), 8.79 grams of 2,2,6,6-tetramethyl-1-piperidinyloxy (TEMPO) (Aldrich), 6.99 grams of potassium persulfate (Aldrich), and 3.6 grams of sodium bisulfite (Aldrich) were charged as a slurry into a 2 liter stainless steel jacketed reactor equipped with a stirrer, resistance temperature detector (RTD), and a water condenser. The reactor jacket temperature was adjusted to 125° C. The reaction was accomplished under gentle nitrogen purge at 600 RPM stirring. After 5 hours at 120° C. (jacket temperature maintained at 125° C.), the slurry was cooled to room temperature, about 25° C. throughout, discharged and precipitated in excess of 1/1 (v/v) acetone/methanol solvent mixture. After precipitation, filtration and drying in a vacuum oven at 100° C. at full vacuum, total polymer product yield was 206.5 grams, or 86 percent of theoretical yield. Shimadzu gel permeation chromatograph (aqueous sodium nitrate as eluant) evidenced a $M_w$=2.2×10$^4$ with a polydispersity ($M_w/M_n$) of 1.44.

EXAMPLE II

Preparation of Carbon Black Dispersion:

A carbon black dispersion was prepared with a modified Microfluidizer model M110F in a closed system for high temperature operation.

Modification of Microfluidizer M110F:

The model M100F microfluidizer was modified for the purpose of this Example. A 6 foot heating tape, available from Electrothermal (cat. #HT642 S962) was wrapped around the lower half of the feeding tank. Air inlet and outlet tube connectors were installed on two holes tapped on opposite side of the isolator for the purpose of cooling down the plunger seal and the face seal in the seal retainer area with air at a temperature between about 5 to about 60° C. A cooling jacket was installed around the pump body to cool down the temperature of the pump body and the seal retainer. The cooling temperature in the jacket was maintained between −55 and −65° C. The steam pressure built up within the feeding tank could be controlled between 0 and 40 psi by installing a cooling coil at the top of the feeding tank, however, in this Example cooling was controlled by adding dry ice on top of the feeding tank. The microfluidizer M110F was modified primarily to enable cool air circulation through the seal retainer area.

Preparation of Carbon Black Dispersion:

A mixture of 57.2 grams of Columbia carbon black Raven 5750, poly(styrene sulfonate)-TEMPO terminated sodium salt obtained from Example I, 22.8 grams, and deionized water, 320 grams, was predispersed in a 1 liter stainless steel beaker with a Polytron at 10,000 to 12,000 rpm for 5 minutes. The resulting dispersion was added to the feeding tank. The heating tape was then set to maximum output and the microfluidizer turned on to reach a working pressure of 13,000 psi. When the temperature of the dispersion reaches 50° C., dry ice and acetone were added to the cooling jacket to cool down the temperature of the pump body and the seal retaining area. The temperature of the dispersion increased to 125° C. within 15 minutes. This temperature was maintained between 125 to 130° C. (Centigrade throughout) for an hour while maintaining the steam pressure inside the feeding tank around 30 to 40 psi by adding dry ice to the top cover of the feeding tank. The heating tape was then turned off and the microfluidizer was left to cool down to room temperature, about 25 degrees Centigrade. The water-based carbon black dispersion containing 14.3 percent by weight of carbon black, and 5.7 percent by weight of Tempo-terminated poly(styrene sulfonate) was recovered from the sample container. No settling of the dispersion was observed over a period of 48 hours, that is for example, it was stable.

EXAMPLE III

Preparation of Yellow Dispersion:

A yellow dispersion was prepared by essentially repeating Example II except for three changes: 1) the use of Sunbrite Yellow 14 (6001) available from Sun Chemicals instead of carbon black; 2) the pigmented polymer solution (40 grams of solid in 200 grams of water) was processed in a Szegvari Attritor System Type 01S, 0.19 inch SS shots, available from Union Process for 1 hour at room temperature and then at 80° C. until 90 percent of the particles are below 100 nanometers (volume average) as measured with a Nicomp Particle Sizer, and prior to adding the solution (diluted with water to 400 grams total) to the microfluidizer tank the sample was centrifuged (Damon/IEC HT Centrifuge) at 5,000 rpm for a period of 5 minutes to remove any stainless steel contamination by decanting the solution; the microfluidizer processing temperature, 130° C., and pressure, 13,000 psi, was maintained for 2 hours. The ratio of pigment to polymer was 1:1. The dilution step to 400 grams was selected since the attritor was to be rinsed to maximize the transfer of the pigment dispersion from the attritor to the microfluidizer. After 2 hours, the sample was cooled, washed 3 times with water (particles settled at 10,000 rpm for 20 minutes to yield a dispersion with a minimum excess of poly(styrene sulfonate)-TEMPO terminated sodium salt and with a particle size by volume of 41 nanometers as obtained with a Nicomp Model 370 particle sizer. The resulting stable dispersion obtained by the above process contained between 4.5 to 5.0 percent of Sunbrite Yellow 14 with an equal amount of poly(styrene sulfonate)-TEMPO terminated sodium salt.

EXAMPLE IV

Preparation of Yellow Dispersion:

A yellow dispersion was prepared as per Example II except for three changes: 1) the use of Sunbrite Yellow 14 (6001) available from Sun Chemical instead of carbon black; 2) the pigmented polymer solution (40 grams of solid in 200 grams of water) was processed in a Szegvari Attritor System Type 01S, 0.19 in SS shots, available from Union Process, for 1 hour at room temperature and then at 80° C. until 90 percent of the particles were below 100 nanometers (volume average) as measured with a Nicomp Model 370 Particle Sizer, and prior to adding the solution (diluted with water to 400 grams total) to the microfluidizer tank the sample was centrifuged (Damon/IEC HT Centrifuge) at 5,000 rpm for a period of 5 minutes to remove any stainless steel contamination by decanting the solution; the microfluidizer processing temperature, 130° C., and pressure, 13,000 psi, was maintained for 2 hours. The ratio of pigment to polymer was 2:1. The dilution step to 400 grams was selected since the attritor was to be rinsed to maximize the transfer of the pigment dispersion from the attritor to the microfluidizer. After 2 hours, the sample was cooled, washed 3 times with water (particles settled at 10,000 rpm for 20 minutes to yield a dispersion with a minimum excess of poly(styrene sulfonate)-TEMPO terminated sodium salt, and with particle size by volume of 123 nanometers as obtained with a Nicomp Model 370 particle sizer. The resulting stable dispersion obtained by the above process contained between 6.0 to 6.6 percent of Sunbrite Yellow 14 with between 3.0 to 3.3 percent of poly(styrene sulfonate)-TEMPO terminated sodium salt.

EXAMPLE V

Preparation of Yellow Dispersion:

A yellow dispersion was prepared as per Example II except for three changes: 1) the use of Permanent Yellow GR available from Hoescht instead of carbon black; 2) the pigmented polymer solution (40 grams of solid in 200 grams of water) was processed in a Szegvari Attritor System Type 01S, 0.19 in SS shots, available from Union Process, for 1 hour at room temperature and then at 80° C. until 90 percent of the particles were below 100 nanometers (volume average) as measured with a Nicomp Particle Sizer, and prior to adding the solution (diluted with water to 400 grams total) to the microfluidizer tank the sample was centrifuged (Damon/IEC HT Centrifuge) at 5,000 rpm for a period of 5 minutes to remove any stainless steel contamination by decanting the solution; the microfluidizer processing temperature, 130° C., and pressure, 13,000 psi, were maintained for 2 hours. The ratio of pigment to polymer was 1:1. The dilution step to 400 grams was selected since the attritor was to be rinsed to maximize the transfer of the pigment dispersion from the attritor to the microfluidizer. After 2 hours, the sample was cooled, washed 3 times with water (particles settled at 10,000 rpm for 20 minutes to yield a dispersion with a minimum excess of poly(styrene sulfonate)-TEMPO terminated sodium salt and with a particle size by volume of 80 nanometers as obtained with a Nicomp Model 370 particle sizer. The resulting stable dispersion obtained by the above process contained between 4.5 to 5.0 percent Permanent Yellow GR with an equal amount of poly(styrene sulfonate)-TEMPO terminated sodium salt.

EXAMPLE VI

Yellow Ink Formulations:

The suitability of the dispersions for inks was evaluated by adding different ratios of solvent and surfactants to the Permanent Yellow GR dispersion of Example V.

Ink VI. A:

An ink was prepared by mixing in a 120 grams glass amber bottle: 69.31 grams of the Yellow GR dispersion obtained in Example V (prediluted with deionized water to 5 percent pigment); 15.0 grams of trimethylol propane available from Aldrich; 15.0 grams of sulfolane available from Aldrich; 0.3 grams of N-lauroyl sarcosine available from Sigma; and 0.3 grams of Surfadone LP100 available from International Specialty Products. The resulting mixture was further stirred with a magnetic stirrer for 16 hours and then filtered with a 1 micron fiberglass Gelman prefilter. The resulting ink was found to have a pH of 6.0, a surface tension of 37.5 mN/m as measured with a Whilhelmy plate on a Kruss surface tensiometer, a viscosity of 2.20 cP as measured at room temperature on a Brookfield viscometer model LVTD with UL adapter. The ink contains 3.4 percent by weight Permanent Yellow GR, 3.4 percent by weight of poly(styrene sulfonate)-TEMPO terminated, 15.01 percent by weight of trimethylol propane, 15.01 percent sulfolane, 0.3 percent N-lauroyl sarcosine and 0.3 percent by weight Surfadone LP100 in water. The ink was successfully jetted on a HP1200C printer. Its jetting performance was also measured on a Xerox 600 spi LYC experimental thermal ink jet printhead. The ink was found to have a latency of 57 seconds at 15 percent relative humidity. The latency in this context is defined as the maximum time that a printhead can remain idle without maintenance station without effect on the jetting performance. The maximum jetting frequency, that is the optimum frequency at which the printhead can be driven without affecting the jetting performance, was 9.5 kHz and the drop volume 12.1 picoliters after 107 drops. The ink was 100 percent waterfast as measured by soaking the images in tap water for a period of 5 minutes and measuring the change in optical density. The optical density before and after washing was 0.76 as measured with a Macbeth TR927 density meter. Solid 8 and ¼" by 11 and ¼" printed images were stored in an environmental chamber for a period of 30 days at 50 percent relative humidity. No detectable image curl could be measured.

Ink VI. B:

An ink was prepared by mixing in a 120 gram glass amber bottle 69.31 grams of the Yellow GR dispersion obtained in Example V (prediluted with deionized water to 5 percent pigment); 5.0 grams of trimethylol propane available from Aldrich; 15.0 grams of sulfolane available from Aldrich; 10.0 grams of 1,4-bis(2-hydroxyethoxy)-2-butyne available from Aldrich; 0.3 gram of N-lauroyl sarcosine available from Sigma; and 0.3 gram of Surfadone LP100 available from International Speciality Products. The resulting mixture was further stirred with a magnetic stirrer for 16 hours and then filtered with a 1 micron fiberglass Gelman prefilter. The ink was found to have a pH of 7.43, a surface tension of 33.3 mN/m as measured with a Whilhelmy plate on a Kruss surface tensiometer, a viscosity of 2.18 cP as measured at room temperature on a Brookfield viscometer model LVTD with UL adaptor. It contains 3.4 percent by weight of Permanent Yellow GR, 3.4 percent by weight of poly (styrene sulfonate)-TEMPO terminated, 5.00 percent by weight of trimethylol propane, 10.0 percent by weight of 1,4-bis(2-hydroxyethoxy)-2-butyne, 15.01 percent by weight of sulfolane, 0.3 percent by weight of N-lauroyl sarcosine, and 0.3 percent by weight of Surfadone LP100 in water. The ink was successfully jetted on a HP1200C printer. Its jetting performance was measured on a Xerox Corporation 600 spi LYC experimental thermal ink jet printhead. The ink was found to have a latency of 800 seconds at 15 percent relative humidity. The latency in this context was the maximum time that a printhead can remain idle without maintenance station without effect on the jetting performance. The maximum jetting frequency, that is the optimum frequency at which the printhead can be driven without affecting the jetting performance was 9.0 kHz and the drop volume 11.4 picoliters after 107 drops. The ink is expected to be 100 percent waterfast and the images curl free.

Ink VI. C:

An ink was prepared by mixing in a 120 gram glass amber bottle 58.31 grams of the Yellow GR dispersion obtained in Example V (prediluted with deionized water to 3.5 percent pigment); 5.0 grams of trimethylol propane available from Aldrich; 10.0 grams of 1,4-bis(2-hydroxyethoxy)-2-butyne available from Aldrich; 15.0 grams of sulfolane available from Aldrich; 0.3 gram of N-lauroyl sarcosine available from Sigma; and 0.3 gram of Surfadone LP100 available from International Speciality Products. The resulting mixture was further stirred with a magnetic stirrer for 16 hours and then filtered with a 1 micron fiberglass Gelman prefilter. The ink was found to have a pH of 7.58, a surface tension of 34.1 mN/m as measured with a Whilhelmy plate on a Kruss surface tensiometer, a viscosity of 2.28 cP as measured at room temperature on a Brookfield viscometer model LVTD with UL adapter. The ink contained 3.2 percent by weight of Permanent Yellow GR, 3.2 percent by weight of poly(styrene sulfonate)-TEMPO terminated, 5.62 percent by weight of trimethylol propane, 11.25 percent by weight of 1,4-bis(2-hydroxyethoxy)-2-butyne, 16.87 percent of sulfolane, 0.34 percent of N-lauroyl sarcosine and 0.34 percent by weight of Surfadone LP100 in water. The ink was successfully jetted on a HP1200C printer. Its jetting performance was measured on a Xerox 600 spi LYC experimental thermal ink jet printhead. The ink was found to have a latency of 20 seconds at 15 percent relative humidity. The latency in this context was defined as the maximum time that a printhead can remain idle without maintenance station without effect on the jetting performance. The maximum jetting frequency, that is the optimum frequency at which the printhead can be driven without affecting the jetting performance, was 2.0 kHz and the drop volume 10.3 picoliters after $10^7$ drops. The ink is expected to be 100 percent waterfast and the images curl free.

Ink VI. D:

An ink was prepared by mixing in a 120 gram glass amber bottle 69.31 grams of the Yellow GR dispersion obtained in Example V (prediluted with deionized water to 5 percent pigment); 8.0 grams of pantothenol available from Aldrich; 7.0 grams of trimethyol propane; 15.0 grams of sulfolane available from Aldrich; 0.3 gram of N-lauroyl sarcosine available from Sigma; and 0.3 gram of Surfadone LP100 available from International Speciality Products. The resulting mixture was further stirred with a magnetic stirrer for 16 hours and then filtered with a 1 micron fiberglass Gelman prefilter. The ink was found to have a pH of 7.64, a surface tension of 34.4 mN/m as measured with a Whilhelmy plate on a Kruss surface tensiometer, and a viscosity of 2.15 cP as measured at room temperature on a Brookfield viscometer model LVTD with UL adaptor. It, that is the ink, contained 3.4 percent by weight of Permanent Yellow GR, 3.4 percent by weight of poly(styrene sulfonate)-TEMPO terminated, 7.0 percent by weight of trimethylol propane, 8.0 percent by weight of pantothenol, 15.01 percent by weight of sulfolane, 0.3 percent by weight of N-lauroyl sarcosine and 0.3 percent by weight of Surfadone LP100 in water. The ink was successfully jetted on a HP1200C printer. Its jetting performance was also measured on a Xerox 600 spi LYC experimental thermal ink jet printhead. The ink was found to have a latency of 400 seconds at 15 percent relative humidity. The latency in this context was defined as the maximum time that a printhead can remain idle without maintenance station without effect on the jetting performance. The maximum jetting frequency was 7.5 kHz in the same printhead and the drop volume 11.3 picoliters after $10^7$ drops. The ink is expected to be 100 percent waterfast and the images curl free.

Other modifications of the present invention may occur to those skilled in the art, especially subsequent to a review of the present application and these modifications, including equivalents thereof, are intended to be included within the scope of the present invention.

What is claimed is:

1. A method of imaging comprising jetting with a liquid jetting means an ink jettable ink composition comprised of a liquid carrier vehicle and stabilized core particles comprised of resin, colorant, and a stabilizer component, which is covalently bonded to the core particles, in a predetermined pattern onto a receiving member to form an image; and fixing the image to a receiver by heating or irradiating the image and/or the receiver at from about 40 to about 150° C.

2. A method in accordance with claim 1 wherein the colorant is a pigment, and wherein there results high quality images with an optical density of from about 1.0 to about 1.5 for black images.

3. A method in accordance with claim 1 wherein the ink composition has a latency of about 5 seconds to about 2,000 seconds, wherein the heating or fixing of the image is accomplished at a temperature of about 25° C. to about 90° C., and wherein the resulting images possess an edge raggedness or an MFLEN value of from about 1 to about 10.

4. A method in accordance with claim 1 wherein the resulting developed images possess a resolution of at least about 600 spi when jetted from an ink jet printhead, and wherein there results essentially no kogation on the heating elements of the jetting nozzles after continuous jetting of the ink at a rate of from about $10^6$ to about $10^9$ drops.

* * * * *